United States Patent
Ma et al.

(10) Patent No.: US 10,652,163 B2
(45) Date of Patent: May 12, 2020

(54) BOOSTING LINKED LIST THROUGHPUT

(71) Applicant: Cisco Technology, Inc., San Jose, CA (US)

(72) Inventors: Sha Ma, San Jose, CA (US); Felice Bonardi, San Jose, CA (US); Philip Chen, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 726 days.

(21) Appl. No.: 14/494,510

(22) Filed: Sep. 23, 2014

(65) Prior Publication Data
US 2015/0124833 A1    May 7, 2015

Related U.S. Application Data

(60) Provisional application No. 61/900,377, filed on Nov. 5, 2013.

(51) Int. Cl.
*H04L 12/863* (2013.01)
*H04L 12/865* (2013.01)
(Continued)

(52) U.S. Cl.
CPC ............ *H04L 47/6275* (2013.01); *G06F 5/16* (2013.01); *G06F 9/4881* (2013.01); *H04L 45/74* (2013.01);
(Continued)

(58) Field of Classification Search
CPC ..... H04L 45/74; H04L 47/62; H04L 47/6275; H04L 47/623; H04L 47/562;
(Continued)

(56) References Cited

U.S. PATENT DOCUMENTS 4,298,770 A    11/1981 Nishihara et al.
4,636,919 A    1/1987 Itakura et al.
(Continued)

FOREIGN PATENT DOCUMENTS

WO      2003067799 A2    8/2003
WO      WO 2014/071996   5/2014

OTHER PUBLICATIONS

Anonymous, Data Structure, Method, and Computer Program for Providing a Linked List in a First Dimension and a Plurality of Linked Lists in a Second Dimension, Jun. 11, 2008, An IP.com Prior Art Database Technical Disclosure, whole document (Year: 2008).*
(Continued)

*Primary Examiner* — Un C Cho
*Assistant Examiner* — Jose L Perez
(74) *Attorney, Agent, or Firm* — Polsinelli PC

(57) ABSTRACT

Multiple listlets function as a single master linked list to manage data packets across one or more banks of memory in a first-in first-out (FIFO) order, while allowing multiple push and/or pop functions to be performed per cycle. Each listlet can be a linked list that tracks pointers and is stored in a different memory bank. The nodes can include a pointer to a data packet, a pointer to the next node in the listlet and a next listlet identifier that identifies the listlet that contains the next node in the master linked list. The head and tail of each listlet, as well as an identifier each to track the head and tail of the master linked list, can be maintained in cache. The individual listlets are updated accordingly to maintain order of the master linked list as pointers are pushed and popped from the master linked list.

20 Claims, 8 Drawing Sheets

(51) Int. Cl.
  *G06F 5/16* (2006.01)
  *G06F 9/48* (2006.01)
  *H04L 12/875* (2013.01)
  *H04L 12/741* (2013.01)

(52) U.S. Cl.
  CPC ............ *H04L 47/50* (2013.01); *H04L 47/562* (2013.01); *H04L 47/62* (2013.01); *H04L 47/623* (2013.01); *G06F 2205/064* (2013.01)

(58) Field of Classification Search
  CPC ....... H04L 12/5693; H04L 47/50; G06F 5/16; G06F 9/4881; G06F 2205/064
  See application file for complete search history.

(56) References Cited

U.S. PATENT DOCUMENTS

| | | | |
|---|---|---|---|
| 4,700,016 A | 10/1987 | Hitchcock et al. | |
| 5,115,431 A | 5/1992 | Williams et al. | |
| 5,859,835 A | 1/1999 | Varma et al. | |
| 5,926,458 A | 7/1999 | Yin | |
| 6,252,876 B1 | 6/2001 | Brueckheimer et al. | |
| 6,389,031 B1 | 5/2002 | Chao et al. | |
| 6,677,831 B1 | 1/2004 | Cheng et al. | |
| 6,714,553 B1* | 3/2004 | Poole ................ | H04L 12/4625 370/412 |
| 6,757,897 B1 | 6/2004 | Shi et al. | |
| 6,876,952 B1 | 4/2005 | Kappler et al. | |
| 6,907,039 B2 | 6/2005 | Shen | |
| 6,941,649 B2 | 9/2005 | Goergen | |
| 6,952,421 B1 | 10/2005 | Slater | |
| 6,954,463 B1 | 10/2005 | Ma et al. | |
| 6,996,099 B1 | 2/2006 | Kadambi et al. | |
| 7,068,667 B2 | 6/2006 | Foster et al. | |
| 7,152,117 B1 | 12/2006 | Stapp et al. | |
| 7,177,946 B1 | 2/2007 | Kaluve et al. | |
| 7,372,857 B1 | 5/2008 | Kappler et al. | |
| 7,411,915 B1 | 8/2008 | Spain et al. | |
| 7,426,604 B1* | 9/2008 | Rygh ................. | G06F 5/06 710/52 |
| 7,516,211 B1 | 4/2009 | Gourlay et al. | |
| 7,539,131 B2 | 5/2009 | Shen | |
| 7,580,409 B1 | 8/2009 | Swenson et al. | |
| 7,630,368 B2 | 12/2009 | Tripathi et al. | |
| 7,729,296 B1 | 6/2010 | Choudhary | |
| 7,826,469 B1 | 11/2010 | Li et al. | |
| 8,233,384 B2 | 7/2012 | Osterhout et al. | |
| 8,302,301 B2 | 11/2012 | Lau | |
| 8,325,459 B2 | 12/2012 | Mutnury et al. | |
| 8,339,973 B1 | 12/2012 | Pichumani et al. | |
| 8,378,223 B1 | 2/2013 | Shiue et al. | |
| 8,442,063 B1* | 5/2013 | Zhou ................. | H04L 12/1881 370/413 |
| 8,514,712 B1 | 8/2013 | Aswadhati | |
| 8,687,629 B1 | 4/2014 | Kompella et al. | |
| 8,868,766 B1 | 10/2014 | Theimer et al. | |
| 8,908,691 B2 | 12/2014 | Biswas et al. | |
| 9,036,481 B1 | 5/2015 | White | |
| 9,106,508 B2 | 8/2015 | Banavalikar et al. | |
| 9,178,715 B2 | 11/2015 | Jain et al. | |
| 9,197,551 B2 | 11/2015 | DeCusatis et al. | |
| 9,203,188 B1 | 12/2015 | Siechen et al. | |
| 9,258,195 B1 | 2/2016 | Pendleton et al. | |
| 9,325,524 B2 | 4/2016 | Banavalikar et al. | |
| 9,374,294 B1 | 6/2016 | Pani | |
| 9,402,470 B2 | 8/2016 | Shen et al. | |
| 9,407,501 B2 | 8/2016 | Yadav et al. | |
| 9,426,060 B2 | 8/2016 | Dixon et al. | |
| 9,433,081 B1 | 8/2016 | Xiong et al. | |
| 9,444,634 B2 | 9/2016 | Pani | |
| 9,502,111 B2 | 11/2016 | Dharmapurikar et al. | |
| 9,509,092 B2 | 11/2016 | Shen et al. | |
| 9,544,185 B1 | 1/2017 | Yadav et al. | |
| 9,544,224 B2 | 1/2017 | Chu et al. | |
| 9,590,914 B2 | 3/2017 | Attar et al. | |
| 9,627,063 B2 | 4/2017 | Dharmapurikar et al. | |
| 9,634,846 B2 | 4/2017 | Pani | |
| 9,635,937 B2 | 5/2017 | Shen et al. | |
| 9,654,300 B2 | 5/2017 | Pani | |
| 9,654,385 B2 | 5/2017 | Chu et al. | |
| 9,654,409 B2 | 5/2017 | Yadav et al. | |
| 9,655,232 B2 | 5/2017 | Saxena et al. | |
| 9,667,431 B2 | 5/2017 | Pani | |
| 9,667,551 B2 | 5/2017 | Edsall et al. | |
| 9,674,086 B2 | 6/2017 | Ma et al. | |
| 9,686,180 B2 | 6/2017 | Chu et al. | |
| 9,698,994 B2 | 7/2017 | Pani | |
| 9,716,665 B2 | 7/2017 | Attar et al. | |
| 9,742,673 B2 | 8/2017 | Banerjee et al. | |
| 9,755,965 B1 | 9/2017 | Yadav et al. | |
| 9,769,078 B2 | 9/2017 | Attar et al. | |
| 9,876,715 B2 | 1/2018 | Edsall et al. | |
| 2002/0126671 A1 | 9/2002 | Ellis et al. | |
| 2002/0136268 A1 | 9/2002 | Gan et al. | |
| 2002/0146026 A1 | 10/2002 | Unitt et al. | |
| 2003/0035385 A1 | 2/2003 | Walsh et al. | |
| 2003/0058837 A1 | 3/2003 | Denney et al. | |
| 2003/0058860 A1 | 3/2003 | Kunze et al. | |
| 2003/0067924 A1 | 4/2003 | Choe et al. | |
| 2003/0097461 A1 | 5/2003 | Barham et al. | |
| 2003/0115319 A1 | 6/2003 | Dawson et al. | |
| 2003/0120884 A1 | 6/2003 | Koob et al. | |
| 2003/0137940 A1 | 7/2003 | Schwartz et al. | |
| 2003/0142629 A1 | 7/2003 | Krishnamurthi et al. | |
| 2003/0174650 A1 | 9/2003 | Shankar et al. | |
| 2003/0223376 A1 | 12/2003 | Elliott et al. | |
| 2003/0231646 A1 | 12/2003 | Chandra et al. | |
| 2004/0034743 A1* | 2/2004 | Wolrich ................. | H04L 49/90 711/132 |
| 2004/0062259 A1 | 4/2004 | Jeffries et al. | |
| 2004/0073715 A1 | 4/2004 | Folkes et al. | |
| 2004/0100901 A1 | 5/2004 | Bellows | |
| 2004/0103310 A1 | 5/2004 | Sobel et al. | |
| 2004/0111507 A1 | 6/2004 | Villado et al. | |
| 2004/0151170 A1* | 8/2004 | Gulati ................. | H04L 49/9015 370/360 |
| 2004/0160956 A1 | 8/2004 | Hardy et al. | |
| 2004/0249960 A1 | 12/2004 | Hardy et al. | |
| 2005/0007961 A1 | 1/2005 | Scott et al. | |
| 2005/0013280 A1 | 1/2005 | Buddhikot et al. | |
| 2005/0073958 A1 | 4/2005 | Atlas et al. | |
| 2005/0086416 A1* | 4/2005 | Utley ................. | H04L 49/90 711/5 |
| 2005/0091239 A1* | 4/2005 | Ward ................. | G06F 9/526 |
| 2005/0171937 A1* | 8/2005 | Hughes ............... | G06F 16/9014 |
| 2005/0175020 A1 | 8/2005 | Park et al. | |
| 2005/0201375 A1 | 9/2005 | Komatsu et al. | |
| 2005/0207410 A1 | 9/2005 | Adhikari et al. | |
| 2005/0213504 A1 | 9/2005 | Enomoto et al. | |
| 2005/0232227 A1 | 10/2005 | Jorgenson et al. | |
| 2005/0240745 A1* | 10/2005 | Iyer .................... | G06F 12/0223 711/167 |
| 2006/0028285 A1 | 2/2006 | Jang et al. | |
| 2006/0031643 A1* | 2/2006 | Figueira ............ | G06F 13/387 711/154 |
| 2006/0075093 A1 | 4/2006 | Frattura et al. | |
| 2006/0083179 A1 | 4/2006 | Mitchell | |
| 2006/0083256 A1 | 4/2006 | Mitchell | |
| 2006/0182036 A1 | 8/2006 | Sasagawa et al. | |
| 2006/0198315 A1 | 9/2006 | Sasagawa et al. | |
| 2006/0209688 A1 | 9/2006 | Tsuge et al. | |
| 2006/0209702 A1 | 9/2006 | Schmitt et al. | |
| 2006/0215572 A1 | 9/2006 | Padhye et al. | |
| 2006/0215623 A1 | 9/2006 | Lin et al. | |
| 2006/0221835 A1 | 10/2006 | Sweeney | |
| 2006/0239204 A1 | 10/2006 | Bordonaro et al. | |
| 2006/0250982 A1 | 11/2006 | Yuan et al. | |
| 2006/0268742 A1 | 11/2006 | Chu et al. | |
| 2006/0274657 A1 | 12/2006 | Olgaard et al. | |
| 2006/0280179 A1 | 12/2006 | Meier | |
| 2006/0285500 A1 | 12/2006 | Booth, III et al. | |
| 2007/0016590 A1 | 1/2007 | Appleby et al. | |
| 2007/0025241 A1 | 2/2007 | Nadeau et al. | |
| 2007/0053303 A1 | 3/2007 | Kryuchkov | |

(56) References Cited

U.S. PATENT DOCUMENTS

| | | |
|---|---|---|
| 2007/0058557 A1 | 3/2007 | Cuffaro et al. |
| 2007/0061451 A1 | 3/2007 | Villado et al. |
| 2007/0076605 A1 | 4/2007 | Cidon et al. |
| 2007/0091795 A1 | 4/2007 | Bonaventure et al. |
| 2007/0097872 A1 | 5/2007 | Chiu |
| 2007/0159987 A1 | 7/2007 | Khan et al. |
| 2007/0160073 A1 | 7/2007 | Toumura et al. |
| 2007/0211625 A1 | 9/2007 | Liu et al. |
| 2007/0223372 A1 | 9/2007 | Haalen et al. |
| 2007/0233847 A1 | 10/2007 | Aldereguia et al. |
| 2007/0258382 A1 | 11/2007 | Foll et al. |
| 2007/0258383 A1 | 11/2007 | Wada |
| 2007/0274229 A1 | 11/2007 | Scholl et al. |
| 2007/0280264 A1 | 12/2007 | Milton et al. |
| 2008/0031130 A1 | 2/2008 | Raj et al. |
| 2008/0031146 A1 | 2/2008 | Kwak et al. |
| 2008/0031247 A1 | 2/2008 | Tahara et al. |
| 2008/0092213 A1 | 4/2008 | Wei et al. |
| 2008/0126507 A1* | 5/2008 | Wilkinson .......... G06F 13/4059 709/213 |
| 2008/0147830 A1 | 6/2008 | Ridgill et al. |
| 2008/0151863 A1 | 6/2008 | Lawrence et al. |
| 2008/0177896 A1 | 7/2008 | Quinn et al. |
| 2008/0219173 A1 | 9/2008 | Yoshida et al. |
| 2008/0225853 A1 | 9/2008 | Melman et al. |
| 2008/0259809 A1 | 10/2008 | Stephan et al. |
| 2008/0259925 A1 | 10/2008 | Droms et al. |
| 2008/0310421 A1 | 12/2008 | Teisberg et al. |
| 2009/0052332 A1 | 2/2009 | Fukuyama et al. |
| 2009/0094357 A1 | 4/2009 | Keohane et al. |
| 2009/0103566 A1 | 4/2009 | Kloth et al. |
| 2009/0116402 A1 | 5/2009 | Yamasaki |
| 2009/0122805 A1 | 5/2009 | Epps et al. |
| 2009/0188711 A1 | 7/2009 | Ahmad |
| 2009/0193103 A1 | 7/2009 | Small et al. |
| 2009/0225671 A1 | 9/2009 | Arbel et al. |
| 2009/0232011 A1 | 9/2009 | Li et al. |
| 2009/0268614 A1 | 10/2009 | Tay et al. |
| 2009/0271508 A1 | 10/2009 | Sommers et al. |
| 2010/0128619 A1 | 5/2010 | Shigei |
| 2010/0150155 A1 | 6/2010 | Napierala |
| 2010/0189080 A1 | 7/2010 | Hu et al. |
| 2010/0191813 A1 | 7/2010 | Gandhewar et al. |
| 2010/0191839 A1 | 7/2010 | Gandhewar et al. |
| 2010/0223655 A1 | 9/2010 | Zheng |
| 2010/0260197 A1 | 10/2010 | Martin et al. |
| 2010/0287227 A1 | 11/2010 | Goel et al. |
| 2010/0299553 A1 | 11/2010 | Cen |
| 2010/0312875 A1 | 12/2010 | Wilerson et al. |
| 2011/0110241 A1 | 5/2011 | Atkinson et al. |
| 2011/0138310 A1 | 6/2011 | Gomez et al. |
| 2011/0158248 A1 | 6/2011 | Vorunganti et al. |
| 2011/0170426 A1 | 7/2011 | Kompella et al. |
| 2011/0203834 A1 | 8/2011 | Yoneya et al. |
| 2011/0228795 A1 | 9/2011 | Agrawal et al. |
| 2011/0249682 A1 | 10/2011 | Kean et al. |
| 2011/0268118 A1 | 11/2011 | Schlansker et al. |
| 2011/0286447 A1 | 11/2011 | Liu |
| 2011/0286463 A1* | 11/2011 | Tse ...................... H04L 47/6205 370/400 |
| 2011/0299406 A1 | 12/2011 | Vobbilisetty et al. |
| 2011/0310738 A1 | 12/2011 | Lee et al. |
| 2011/0321031 A1 | 12/2011 | Dournov et al. |
| 2012/0007688 A1 | 1/2012 | Zhou et al. |
| 2012/0063318 A1 | 3/2012 | Boddu et al. |
| 2012/0102114 A1 | 4/2012 | Dunn et al. |
| 2012/0147752 A1 | 6/2012 | Ashwood-Smith et al. |
| 2012/0163396 A1* | 6/2012 | Cheng ................ H04L 49/9015 370/412 |
| 2012/0195233 A1 | 8/2012 | Wang et al. |
| 2012/0275304 A1 | 11/2012 | Patel et al. |
| 2012/0281697 A1 | 11/2012 | Huang |
| 2012/0300787 A1 | 11/2012 | Korger |
| 2012/0314581 A1 | 12/2012 | Rajamanickam et al. |
| 2013/0055155 A1 | 2/2013 | Wong et al. |
| 2013/0090014 A1 | 4/2013 | Champion |
| 2013/0097335 A1 | 4/2013 | Jiang et al. |
| 2013/0121341 A1* | 5/2013 | Agrawal ............ H04L 49/9047 370/417 |
| 2013/0124708 A1 | 5/2013 | Lee et al. |
| 2013/0182712 A1 | 7/2013 | Aguayo et al. |
| 2013/0227108 A1 | 8/2013 | Dunbar et al. |
| 2013/0250951 A1 | 9/2013 | Koganti |
| 2013/0311663 A1 | 11/2013 | Kamath et al. |
| 2013/0311991 A1 | 11/2013 | Li et al. |
| 2013/0322258 A1 | 12/2013 | Nedeltchev et al. |
| 2013/0322446 A1 | 12/2013 | Biswas et al. |
| 2013/0322453 A1 | 12/2013 | Allan |
| 2013/0332399 A1 | 12/2013 | Reddy et al. |
| 2013/0332577 A1 | 12/2013 | Nakil et al. |
| 2013/0332602 A1 | 12/2013 | Nakil et al. |
| 2014/0006549 A1 | 1/2014 | Narayanaswamy et al. |
| 2014/0016501 A1 | 1/2014 | Kamath et al. |
| 2014/0043535 A1 | 2/2014 | Motoyama et al. |
| 2014/0043972 A1 | 2/2014 | Li et al. |
| 2014/0047264 A1 | 2/2014 | Wang et al. |
| 2014/0050223 A1 | 2/2014 | Foo et al. |
| 2014/0056298 A1 | 2/2014 | Vobbilisetty et al. |
| 2014/0064281 A1 | 3/2014 | Basso et al. |
| 2014/0068750 A1 | 3/2014 | Tjahjono et al. |
| 2014/0086253 A1 | 3/2014 | Yong et al. |
| 2014/0105039 A1 | 4/2014 | Mcdysan |
| 2014/0105062 A1 | 4/2014 | Mcdysan et al. |
| 2014/0105216 A1 | 4/2014 | Mcdysan |
| 2014/0146817 A1 | 5/2014 | Zhang |
| 2014/0146824 A1 | 5/2014 | Angst et al. |
| 2014/0201375 A1 | 7/2014 | Beereddy et al. |
| 2014/0219275 A1 | 8/2014 | Allan et al. |
| 2014/0241353 A1 | 8/2014 | Zhang et al. |
| 2014/0244779 A1 | 8/2014 | Roitshtein et al. |
| 2014/0269705 A1 | 9/2014 | DeCusatis et al. |
| 2014/0269712 A1 | 9/2014 | Kidambi |
| 2014/0307744 A1 | 10/2014 | Dunbar et al. |
| 2014/0321277 A1 | 10/2014 | Lynn, Jr. et al. |
| 2014/0328206 A1 | 11/2014 | Chan et al. |
| 2014/0334295 A1 | 11/2014 | Guichard et al. |
| 2014/0341029 A1 | 11/2014 | Allan et al. |
| 2014/0372582 A1 | 12/2014 | Ghanwani et al. |
| 2015/0009992 A1 | 1/2015 | Zhang |
| 2015/0010001 A1 | 1/2015 | Duda et al. |
| 2015/0092551 A1 | 4/2015 | Moisand et al. |
| 2015/0092593 A1 | 4/2015 | Kompella |
| 2015/0113143 A1 | 4/2015 | Stuart et al. |
| 2015/0124629 A1 | 5/2015 | Pani |
| 2015/0124631 A1 | 5/2015 | Edsall et al. |
| 2015/0124633 A1 | 5/2015 | Banerjee et al. |
| 2015/0124640 A1 | 5/2015 | Chu et al. |
| 2015/0124644 A1 | 5/2015 | Pani |
| 2015/0124806 A1 | 5/2015 | Banerjee et al. |
| 2015/0124817 A1 | 5/2015 | Merchant et al. |
| 2015/0124821 A1 | 5/2015 | Chu et al. |
| 2015/0124823 A1 | 5/2015 | Pani et al. |
| 2015/0124824 A1 | 5/2015 | Edsall et al. |
| 2015/0124825 A1 | 5/2015 | Dharmapurikar et al. |
| 2015/0124832 A1 | 5/2015 | Ma et al. |
| 2015/0127797 A1 | 5/2015 | Attar et al. |
| 2015/0236900 A1 | 8/2015 | Chung |
| 2015/0378712 A1 | 12/2015 | Cameron et al. |
| 2015/0378969 A1 | 12/2015 | Powell et al. |
| 2016/0036697 A1 | 2/2016 | DeCusatis et al. |
| 2016/0119204 A1 | 4/2016 | Murasato et al. |
| 2016/0315811 A1 | 10/2016 | Yadav et al. |
| 2017/0085469 A1 | 3/2017 | Chu et al. |
| 2017/0207961 A1 | 7/2017 | Saxena et al. |
| 2017/0214619 A1 | 7/2017 | Chu et al. |
| 2017/0237651 A1 | 8/2017 | Pani |
| 2017/0237678 A1 | 8/2017 | Ma et al. |

(56) References Cited

U.S. PATENT DOCUMENTS

2017/0250912 A1 8/2017 Chu et al.
2017/0346748 A1 11/2017 Attar et al.

OTHER PUBLICATIONS

International Search Report and Written Opinion for PCT/US2014/063573 dated Jan. 19, 2015.
Author Unknown, "Subset—Wikipedia, the free encyclopedia," Dec. 25, 2014, pp. 1-3.
Aslam, Faisal, et al., "NPP: A Facility Based Computation Framework for Restoration Routing Using Aggregate Link Usage Information," Proceedings of QoS-IP: quality of service in multiservice IP network, Feb. 2005, pp. 150-163.
Chandy, K. Mani, et al., "Distribution Snapshots: Determining Global States of Distributed Systems," ACM Transaction on Computer Systems, Feb. 1985, vol. 3, No. 1, pp. 63-75.
Khasnabish, Bhumip, et al., "Mobility and Interconnection of Virtual Machines and Virtual Network Elements; draft-khasnabish-vmmi-problems-03.txt," Network Working Group, Dec. 30, 2012, pp. 1-29.
Kodialam, Murali, et. al, "Dynamic Routing of Locally Restorable Bandwidth Guaranteed Tunnels using Aggregated Link Usage Information," Proceedings of IEEE INFOCOM, 2001, vol. 1, pp. 376-385.
Li, Li, et. al, "Routing Bandwidth Guaranteed Paths with Local Restoration in Label Switched Networks," IEEE Journal on Selected Areas in Communications, Feb. 7, 2005, vol. 23, No. 2, pp. 1-11.
Mahalingam, M., et al. "VXLAN: A Framework for Overlaying Virtualized Layer 2 Networks over Layer 3 Networks," VXLAN, Internet Engineering Task Force, Internet Draft, located at https://tools.ietf._org/html/draft-mahalingam-dutt-dcops-vxlan-06, Oct. 2013, pp. 1-24.
Moncaster, T., et al., "The Need for Congestion Exposure in the Internet", Oct. 26, 2009, Internet-Draft, pp. 1-22.
Narten, T., et al., "Problem Statement: Overlays for Network Virtualization," draft-ietf-nvo3-overlay-problem-statement-04, Internet Engineering Task Force, Jul. 31, 2013, pp. 1-24.
Pan, P., et. al, "Fast Reroute Extensions to RSVP-TE for LSP Tunnels," RFC-4090. May 2005, pp. 1-38.
Raza, Saqib, et al., "Online Routing of Bandwidth Guaranteed Paths with Local Restoration using Optimized Aggregate Usage Information," IEEE-ICC '05 Communications, May 2005, vol. 1, 8 pages.
Sinha, Shan, et al., "Harnessing TCP's Burstiness with Flowlet Switching," Nov. 2004, 6 pages.

\* cited by examiner

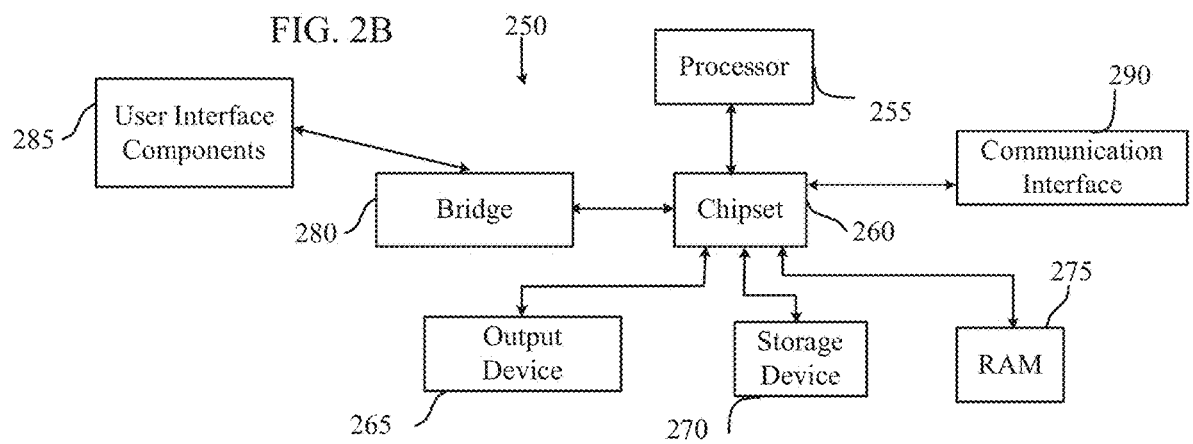
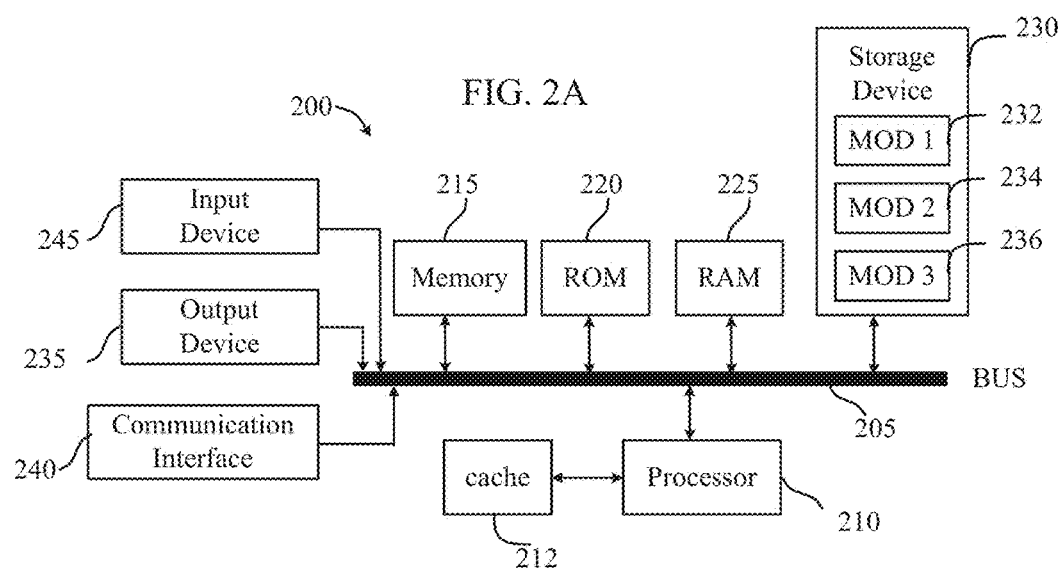

BOOSTING LINKED LIST THROUGHPUT

CROSS REFERENCE TO RELATED APPLICATION

This application claims priority to U.S. Provisional Patent Application No. 61/900,377, filed Nov. 5, 2013, which is expressly incorporated herein by reference in its entirety.

TECHNICAL FIELD

The present technology pertains to linked lists, and more specifically pertains to boosting linked list throughput.

BACKGROUND

Linked lists can be used to implement first-in first-out (FIFO) queues to manage data packet traffic. For example, per-queue lists can be used to track output packet queues sharing a pool of paging buffer memories. The throughputs of such systems are limited by the used memories read operations per second, read latency and write operations per second. To increase throughputs, the linked list can be implemented across multiple banks of memory, however management of the linked list across the multiple memory banks can be challenging.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIGS. 2A and 2B illustrate example system embodiments of a computing device;

DESCRIPTION OF EXAMPLE EMBODIMENTS

Figure 1:
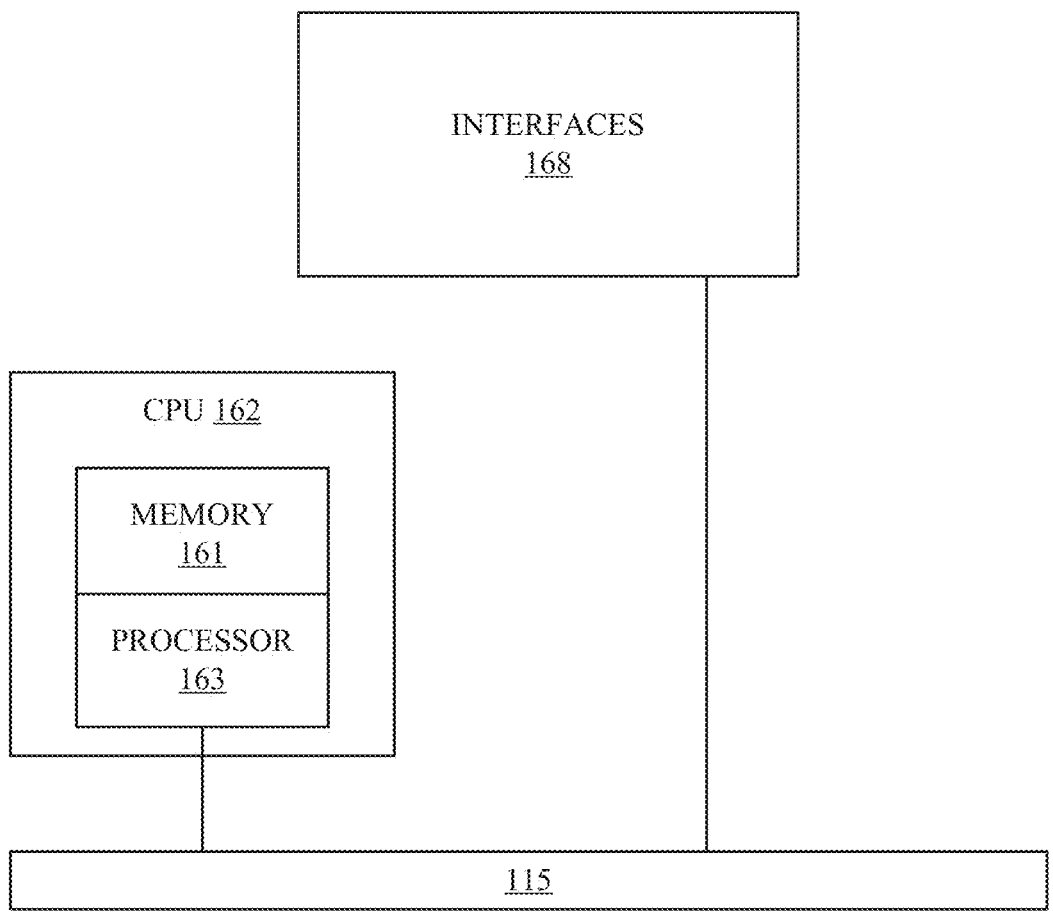
FIG. 1 illustrates an example network device according to some aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

A computing device or network device can utilize multiple listlets to increase throughput of a master linked list of data packets by storing the listlets in multiple banks of memory. Combined, the multiple listlets function as the single master linked list to manage data packets across one or more banks of memory in a first-in first-out (FIFO) order, while allowing multiple push and/or pop functions to be performed per cycle. Each listlet can be a linked list that tracks pointers in one memory bank. The nodes of a listlet can include a pointer to a data packet as well as a pointer to the next node in the listlet. Each node can also include a 'next listlet identifier' that identifies the listlet that contains the next node in the master linked list. The computing or network device can store the head and tail of each listlet, as well as an index each to track the head and tail of the master linked list, in faster cache memory where the data can be quickly accessed and modified. As pointers to data packets are pushed and popped from the master linked list, the computing or network device can update the individual listlets accordingly to maintain the order of the master linked list.

Description

A computer network is a geographically distributed collection of nodes interconnected by communication links and segments for transporting data between endpoints, such as personal computers and workstations. Many types of networks are available, with the types ranging from local area networks (LANs) and wide area networks (WANs) to overlay and software-defined networks, such as virtual extensible local area networks (VXLANs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective "size" of each network.

Overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

Moreover, overlay networks can include virtual segments, such as VXLAN segments in a VXLAN overlay network, which can include virtual L2 and/or L3 overlay networks over which VMs communicate. The virtual segments can be identified through a virtual network identifier (VNI), such as a VXLAN network identifier, which can specifically identify an associated virtual segment or domain.

Network virtualization allows hardware and software resources to be combined in a virtual network. For example, network virtualization can allow multiple numbers of VMs to be attached to the physical network via respective virtual LANs (VLANs). The VMs can be grouped according to their respective VLAN, and can communicate with other VMs as well as other devices on the internal or external network.

Network segments, such as physical or virtual segments; networks; devices; ports; physical or logical links; and/or traffic in general can be grouped into a bridge or flood domain. A bridge domain or flood domain can represent a broadcast domain, such as an L2 broadcast domain. A bridge domain or flood domain can include a single subnet, but can also include multiple subnets. Moreover, a bridge domain can be associated with a bridge domain interface on a network device, such as a switch. A bridge domain interface can be a logical interface which supports traffic between an L2 bridged network and an L3 routed network. In addition, a bridge domain interface can support internet protocol (IP) termination, VPN termination, address resolution handling, MAC addressing, etc. Both bridge domains and bridge domain interfaces can be identified by a same index or identifier.

Furthermore, endpoint groups (EPGs) can be used in a network for mapping applications to the network. In particular, EPGs can use a grouping of application endpoints in a network to apply connectivity and policy to the group of applications. EPGs can act as a container for buckets or collections of applications, or application components, and tiers for implementing forwarding and policy logic. EPGs also allow separation of network policy, security, and forwarding from addressing by instead using logical application boundaries.

Cloud computing can also be provided in one or more networks to provide computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, and network devices, virtual machines (VMs), etc. For instance, resources may include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources may be used to support virtual networks, virtual machines (VM), databases, applications (Apps), etc.

Cloud computing resources may include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner. Cloud computing resources can also be provisioned via virtual networks in an overlay network, such as a VXLAN.

FIG. 1 illustrates an example network device 110 suitable for implementing the present invention. Network device 110 includes a master central processing unit (CPU) 162, interfaces 168, and bus 115 (e.g., a PCI bus). When acting under the control of appropriate software or firmware, CPU 162 is responsible for executing packet management, error detection, and/or routing functions, such as miscabling detection functions, for example. CPU 162 preferably accomplishes all these functions under the control of software including an operating system and any appropriate applications software. CPU 162 may include one or more processors 163 such as a processor from the Motorola family of microprocessors or the MIPS family of microprocessors. In an alternative embodiment, processor 163 is specially designed hardware for controlling the operations of network device 110. In a specific embodiment, memory 161 (such as non-volatile RAM and/or ROM) also forms part of CPU 162. However, there are many different ways in which memory could be coupled to the system.

Interfaces 168 are typically provided as interface cards (sometimes referred to as "line cards"). Generally, they control the sending and receiving of data packets over the network and sometimes support other peripherals used with network device 110. Among the interfaces 168 that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces 168 may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow CPU 162 to efficiently perform routing computations, network diagnostics, security functions, etc.

Although network device 110 shown in FIG. 1 is one specific embodiment of a network device architecture that can be used to implement the present invention, it is by no means the only network device architecture on which the present invention can be implemented. For example, an architecture having a single processor that handles communications as well as routing computations, etc. is often used. Further, other types of interfaces and media could also be used with network device 110.

The present invention can also be implemented on any type of general computing device capable of network communication with other computing devices. For example, a computing device can be a personal computing device such as a desktop or workstation, a business server, or a portable computing device, such as a laptop, smart phone, or a tablet PC. A computing device can include some or all of the features, components, and peripherals of computing device 200 of FIGS. 2A and 2B.

Regardless of the configuration of network device 100, it may employ one or more memories or memory modules (including memory 161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

FIG. 2A, and FIG. 2B illustrate example possible system embodiments of a computing device. The more appropriate embodiment will be apparent to those of ordinary skill in the art when practicing the present technology. Persons of ordinary skill in the art will also readily appreciate that other system embodiments are possible.

FIG. 2A illustrates an example system embodiment of computing device 200 utilizing a conventional system bus computing system architecture, wherein the components of the system are in electrical communication with each other using bus 205. Example computing device 200 includes processing unit (CPU or processor) 210 and system bus 205 that couples various system components including system memory 215, such as read only memory (ROM) 220 and random access memory (RAM) 225, to processor 210. Computing device 200 can include a cache of high-speed memory connected directly with, in close proximity to, or integrated as part of processor 210. Computing device 200 can copy data from memory 215 and/or storage device 230 to cache 212 for quick access by processor 210. In this way, cache 212 can provide a performance boost that avoids delays to processor 210 while waiting for data. These and other modules can control or be configured to control processor 210 to perform various actions. System memory 215 may be available for use as well. Memory 215 can include multiple different types of memory with different performance characteristics. Processor 210 can include any general purpose processor and a hardware module or software module, such as module 1 232, module 2 234, and module 3 236 stored in storage device 230, configured to control processor 210 as well as a special-purpose processor where software instructions are incorporated into the actual processor design. Processor 210 may essentially be a completely self-contained computing system, containing multiple cores or processors, a bus, memory controller, cache, etc. A multi-core processor may be symmetric or asymmetric.

Computing device 200 can include input device 245 to enable user interaction with computing device 200. Input device 245 can represent any number of input mechanisms, such as a microphone for speech, a touch-sensitive screen for gesture or graphical input, keyboard, mouse, motion input, speech and so forth. Output device 235 can also be one or more of a number of output mechanisms known to those of skill in the art. In some instances, multimodal systems can enable a user to provide multiple types of input to communicate with computing device 200. Communications interface 240 can generally govern and manage the user input and system output. There is no restriction on operating on any particular hardware arrangement and therefore the basic features here may easily be substituted for improved hardware or firmware arrangements as they are developed.

Storage device 230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 225, read only memory (ROM) 220, and hybrids thereof.

Storage device 230 can include software modules 232, 234, 236 for controlling processor 210. Other hardware or software modules are contemplated. Storage device 230 can be connected to system bus 205. In one aspect, a hardware module that performs a particular function can include the software component stored in a computer-readable medium in connection with the necessary hardware components, such as processor 210, bus 205, display 235, and so forth, to carry out the function.

FIG. 2B illustrates a system embodiments of computing device 250 having a chipset architecture that can be used in executing the described method and generating and displaying a graphical user interface (GUI). Computing device 250 is an example of computer hardware, software, and firmware that can be used to implement the disclosed technology. Computing device 250 can include processor 255, representative of any number of physically and/or logically distinct resources capable of executing software, firmware, and hardware configured to perform identified computations. Processor 255 can communicate with chipset 260 that can control input to and output from processor 255. In this example, chipset 260 outputs information to output 265, such as a display, and can read and write information to storage device 270, which can include magnetic media, and solid state media. Chipset 260 can also read data from and write data to RAM 275. Computing device 250 can include bridge 280 for interfacing with a variety of user interface components 285 such as chipset 260. Such user interface components 285 can include a keyboard, a microphone, touch detection and processing circuitry, a pointing device, such as a mouse, and so on. In general, inputs to computing device 250 can come from any of a variety of sources, machine generated and/or human generated.

Chipset 260 can also interface with one or more communication interfaces 290 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by computing device 250 itself by processor 255 analyzing data stored in storage 270 or 275. Further, computing device 250 can receive inputs from a user via user interface components 285 and execute appropriate functions, such as browsing functions by interpreting these inputs using processor 255.

It can be appreciated that example computing devices 200 and 250 can have more than one processor 210 or be part of a group or cluster of computing devices networked together to provide greater processing capability.

Figure 3:
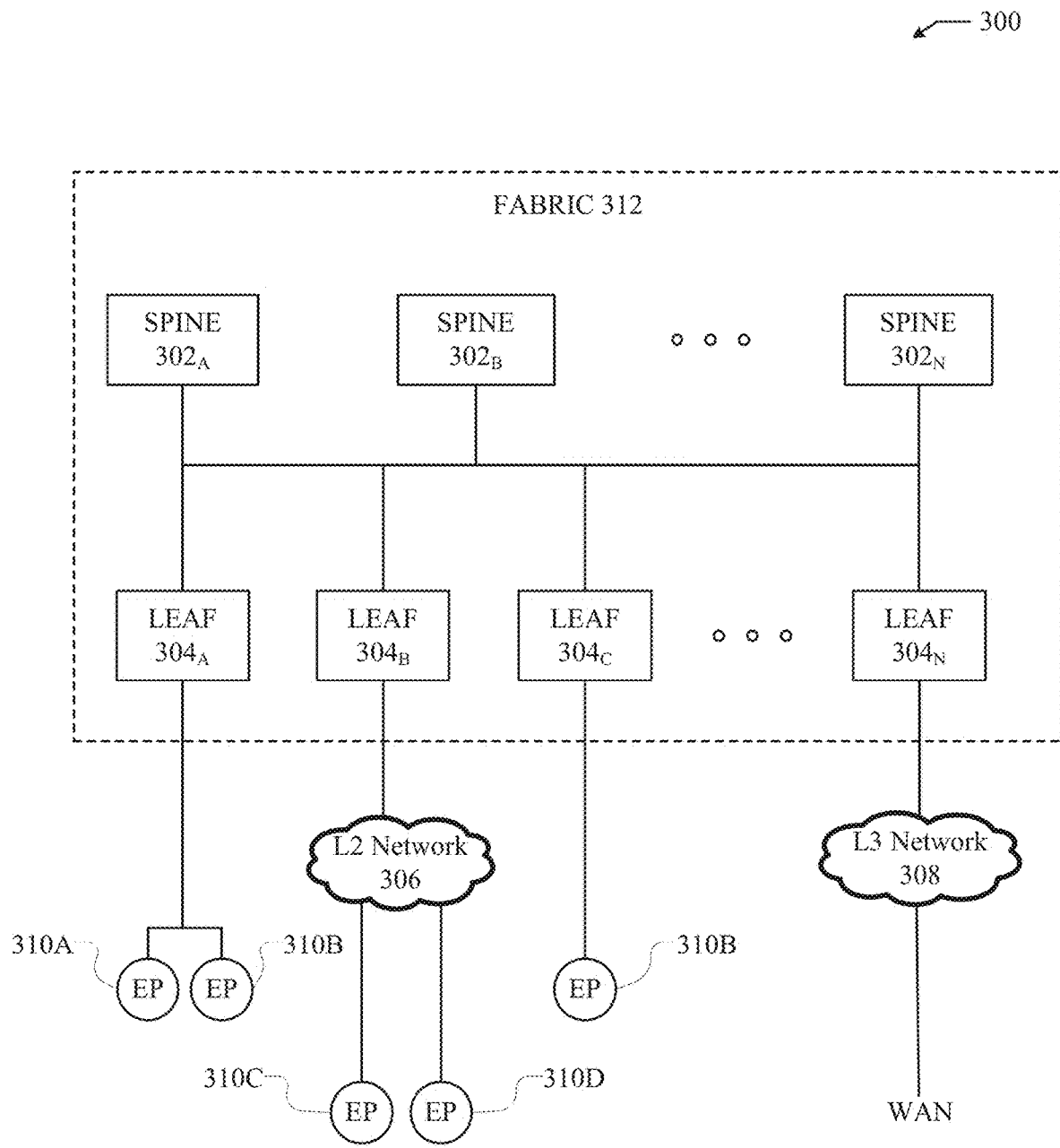
FIG. 3 illustrates a schematic block diagram of an example architecture for a network fabric.

FIG. 3 illustrates a schematic block diagram of example architecture 300 for network fabric 312. Network fabric 312 can include spine switches $302_A$, $302_B$, ..., $302_N$ (collectively "302") connected to leaf switches $304_A$, $304_B$, $304_C$, ..., $304_N$ (collectively "304") in network fabric 312.

Spine switches 302 can be L3 switches in fabric 312. However, in some cases, spine switches 302 can also, or otherwise, perform L2 functionalities. Further, spine switches 302 can support various capabilities, such as 40 or 10 Gbps Ethernet speeds. To this end, spine switches 302 can include one or more 40 Gigabit Ethernet ports. Each port can also be split to support other speeds. For example, a 40 Gigabit Ethernet port can be split into four 10 Gigabit Ethernet ports.

In some embodiments, one or more of spine switches 302 can be configured to host a proxy function that performs a lookup of the endpoint address identifier to locator mapping in a mapping database on behalf of leaf switches 304 that do not have such mapping. The proxy function can do this by parsing through the packet to the encapsulated, tenant packet to get to the destination locator address of the tenant. Spine switches 302 can then perform a lookup of their local mapping database to determine the correct locator address of the packet and forward the packet to the locator address without changing certain fields in the header of the packet.

When a packet is received at spine switch $302_i$, spine switch 302, can first check if the destination locator address is a proxy address. If so, spine switch 302, can perform the proxy function as previously mentioned. If not, spine switch $302_i$ can lookup the locator in its forwarding table and forward the packet accordingly.

Spine switches 302 connect to leaf switches 304 in fabric 312. Leaf switches 304 can include access ports (or non-fabric ports) and fabric ports. Fabric ports can provide uplinks to spine switches 302, while access ports can provide connectivity for devices, hosts, endpoints, VMs, or external networks to fabric 312.

Leaf switches 304 can reside at the edge of fabric 312, and can thus represent the physical network edge. In some cases, leaf switches 304 can be top-of-rack ("ToR") switches configured according to a ToR architecture. In other cases, leaf switches 304 can be aggregation switches in any particular topology, such as end-of-row (EoR) or middle-of-row (MoR) topologies. Leaf switches 304 can also represent aggregation switches, for example.

Leaf switches 304 can be responsible for routing and/or bridging the tenant packets and applying network policies. In some cases, a leaf switch can perform one or more additional functions, such as implementing a mapping cache, sending packets to the proxy function when there is a miss in the cache, encapsulate packets, enforce ingress or egress policies, etc.

Moreover, leaf switches 304 can contain virtual switching functionalities, such as a virtual tunnel endpoint (VTEP) function as explained below in the discussion of VTEP 408 in FIG. 4. To this end, leaf switches 304 can connect fabric 312 to an overlay network, such as overlay network 400 illustrated in FIG. 4.

Network connectivity in fabric 312 can flow through leaf switches 304. Here, leaf switches 304 can provide servers, resources, endpoints, external networks, or VMs access to fabric 312, and can connect leaf switches 304 to each other. In some cases, leaf switches 304 can connect EPGs to fabric 312 and/or any external networks. For example, each EPG can connect to fabric 312 via one of leaf switches 304.

Endpoints 310A-E (collectively "310") can connect to fabric 312 via leaf switches 304. For example, endpoints 310A and 310B can connect directly to leaf switch 304A, which can connect endpoints 310A and 310B to fabric 312 and/or any other one of leaf switches 304. Similarly, endpoint 310E can connect directly to leaf switch 304C, which can connect endpoint 310E to fabric 312 and/or any other of leaf switches 304. On the other hand, endpoints 310C and 310D can connect to leaf switch 304B via L2 network 306. Similarly, the wide area network (WAN) can connect to leaf switches 304C or 304D via L3 network 308.

Endpoints 310 can include any communication device, such as a computing device, network device, server, switch, router, etc. In some cases, endpoints 310 can include a server, hypervisor, or switch configured with a VTEP functionality which connects an overlay network, such as overlay network 400 below, with fabric 312. For example, in some cases, endpoints 310 can represent one or more of the VTEPs 408A-D illustrated in FIG. 4. Here, the VTEPs 408A-D can connect to fabric 312 via leaf switches 304. The overlay network can host physical devices, such as servers, applications, EPGs, virtual segments, virtual workloads, etc. In addition, endpoints 310 can host virtual workload(s), clusters, and applications or services, which can connect with fabric 312 or any other device or network, including an external network. For example, one or more of endpoints 310 can host, or connect to, a cluster of load balancers or an EPG of various applications.

Although fabric 312 is illustrated and described herein as an example leaf-spine architecture, one of ordinary skill in the art will readily recognize that the subject technology can be implemented based on any network fabric, including any data center or cloud network fabric. Indeed, other architectures, designs, infrastructures, and variations are contemplated herein.

Figure 4:
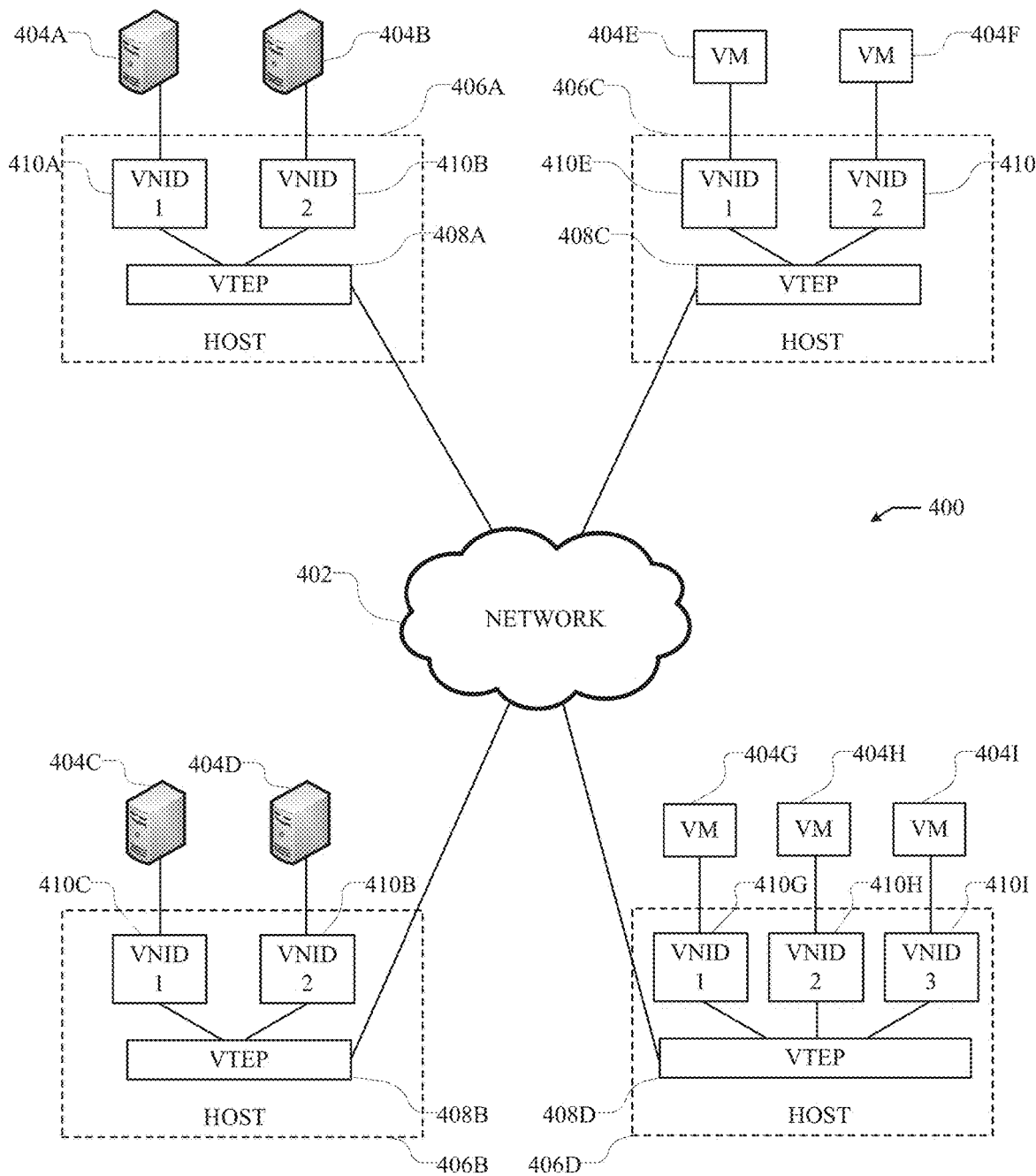
FIG. 4 illustrates an example overlay network.

FIG. 4 illustrates an example overlay network 400. Overlay network 400 uses an overlay protocol, such as VXLAN, VGRE, VO3, or STT, to encapsulate traffic in L2 and/or L3 packets which can cross overlay L3 boundaries in the network. As illustrated in FIG. 4, overlay network 400 can include hosts 406A-D interconnected via network 402.

Network 402 can include a packet network, such as an IP network. Moreover, network 402 can connect overlay network 400 with fabric 312 in FIG. 3. For example, VTEPs 408A-D can connect with leaf switches 304 in fabric 312 via network 402.

Hosts 406A-D include virtual tunnel end points (VTEP) 408A-D, which can be virtual nodes or switches configured to encapsulate and de-encapsulate data traffic according to a specific overlay protocol of the network 400, for the various virtual network identifiers (VNIDs) 410A-I. Moreover, hosts 406A-D can include servers containing a VTEP functionality, hypervisors, and physical switches, such as L3 switches, configured with a VTEP functionality. For example, hosts 406A and 406B can be physical switches configured to run VTEPs 408A-B. Here, hosts 406A and 406B can be connected to servers 404A-D, which, in some cases, can include virtual workloads through VMs loaded on the servers, for example.

In some embodiments, network 400 can be a VXLAN network, and VTEPs 408A-D can be VXLAN tunnel end points. However, as one of ordinary skill in the art will readily recognize, network 400 can represent any type of overlay or software-defined network, such as NVGRE, STT, or even overlay technologies yet to be invented.

The VNIDs can represent the segregated virtual networks in overlay network 400. Each of the overlay tunnels (VTEPs 408A-D) can include one or more VNIDs. For example, VTEP 408A can include VNIDs 1 and 2, VTEP 408B can include VNIDs 1 and 3, VTEP 408C can include VNIDs 1 and 2, and VTEP 408D can include VNIDs 1-3. As one of ordinary skill in the art will readily recognize, any particular VTEP can, in other embodiments, have numerous VNIDs, including more than the 3 VNIDs illustrated in FIG. 4.

The traffic in overlay network 400 can be segregated logically according to specific VNIDs. This way, traffic intended for VNID 1 can be accessed by devices residing in VNID 1, while other devices residing in other VNIDs (e.g., VNIDs 2 and 3) can be prevented from accessing such traffic. In other words, devices or endpoints connected to specific VNIDs can communicate with other devices or endpoints connected to the same specific VNIDs, while traffic from separate VNIDs can be isolated to prevent devices or endpoints in other specific VNIDs from accessing traffic in different VNIDs.

Servers 404A-D and VMs 404E-I can connect to their respective VNID or virtual segment, and communicate with other servers or VMs residing in the same VNID or virtual segment. For example, server 404A can communicate with server 404C and VMs 404E and 404G because they all reside in the same VNID, viz., VNID 1. Similarly, server 404B can communicate with VMs 404F, H because they all reside in VNID 2. VMs 404E-I can host virtual workloads, which can include application workloads, resources, and services, for example. However, in some cases, servers 404A-D can similarly host virtual workloads through VMs hosted on the servers 404A-D. Moreover, each of the servers 404A-D and VMs 404E-I can represent a single server or VM, but can also represent multiple servers or VMs, such as a cluster of servers or VMs.

VTEPs 408A-D can encapsulate packets directed at the various VNIDs 1-3 in the overlay network 400 according to the specific overlay protocol implemented, such as VXLAN, so traffic can be properly transmitted to the correct VNID and recipient(s). Moreover, when a switch, router, or other network device receives a packet to be transmitted to a recipient in the overlay network 400, it can analyze a routing table, such as a lookup table, to determine where such packet needs to be transmitted so the traffic reaches the appropriate recipient. For example, if VTEP 408A receives a packet from endpoint 404B that is intended for endpoint 404H, VTEP 408A can analyze a routing table that maps the intended endpoint, endpoint 404H, to a specific switch that is configured to handle communications intended for endpoint 404H. VTEP 408A might not initially know, when it receives the packet from endpoint 404B, that such packet should be transmitted to VTEP 408D in order to reach endpoint 404H. Accordingly, by analyzing the routing table, VTEP 408A can lookup endpoint 404H, which is the intended recipient, and determine that the packet should be transmitted to VTEP 408D, as specified in the routing table based on endpoint-to-switch mappings or bindings, so the packet can be transmitted to, and received by, endpoint 404H as expected.

However, continuing with the previous example, in many instances, VTEP 408A may analyze the routing table and fail to find any bindings or mappings associated with the intended recipient, e.g., endpoint 404H. Here, the routing table may not yet have learned routing information regarding endpoint 404H. In this scenario, the VTEP 408A may likely broadcast or multicast the packet to ensure the proper switch associated with endpoint 404H can receive the packet and further route it to endpoint 404H.

In some cases, the routing table can be dynamically and continuously modified by removing unnecessary or stale entries and adding new or necessary entries, in order to maintain the routing table up-to-date, accurate, and efficient, while reducing or limiting the size of the table. As one of ordinary skill in the art will readily recognize, the examples and technologies provided above are simply for clarity and explanation purposes, and can include many additional concepts and variations.

Figure 5:
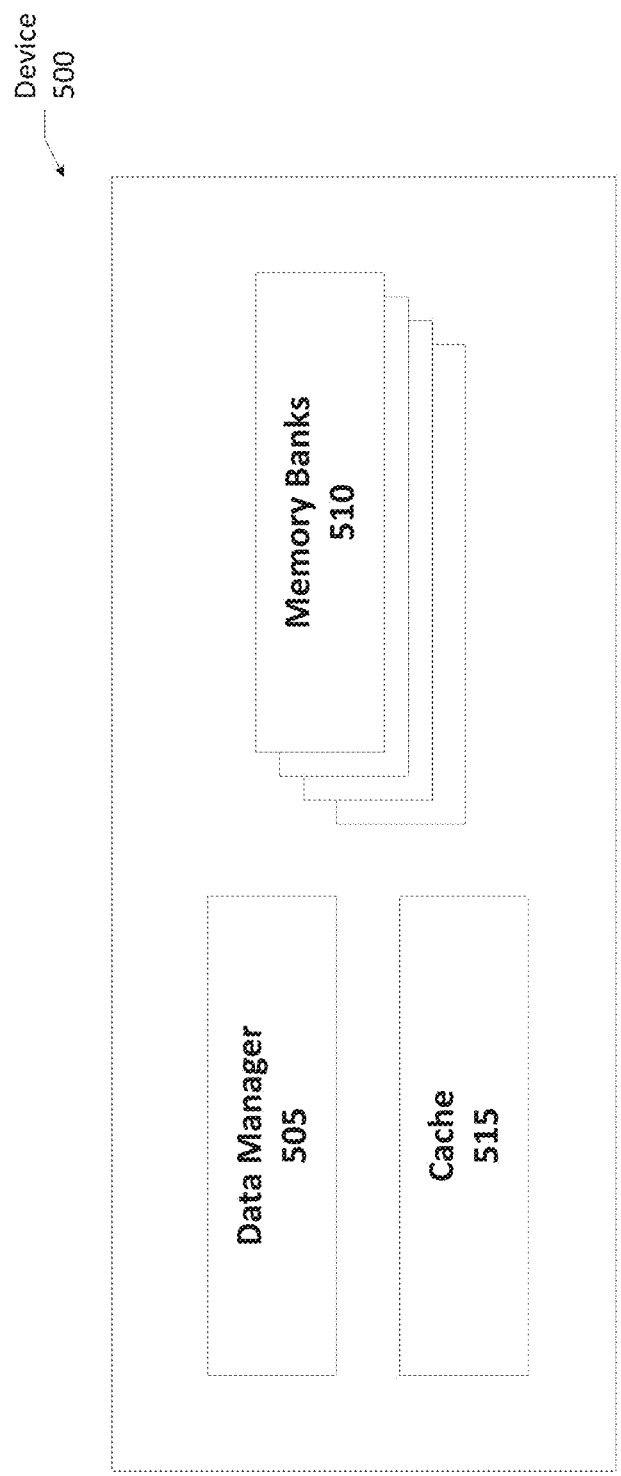
FIG. 5 illustrates an example system embodiment according to some aspects of the subject technology.

FIG. 5 illustrates an example system embodiment in which multiple listlets can be utilized to form a master linked list of pointers to data packets stored in one or more memory banks. As shown, device 500 includes data manager 505 that can manage multiple listlets, each located in a separate memory bank. When combined, the multiple listlets form a master linked list of pointers to data packets stored in one or more memory banks under management by device 500. Device 500 can be any type of computing and/or networking device, such as those described in FIGS. 1, 2A and 2B. Data manager 505 can manage data packet transmissions across a network between various network devices and/or computing devices, such as those described in FIGS. 1, 2A and 2B. For example, in some embodiments, device 500 can be a source device and data manager 505 can transmit data to one or more recipient devices in network connection with device 505. Alternatively, in some embodiments, device 500 can be in network connection with one or more source devices and recipient devices and device 500 can serve as an intermediary between the various source and recipient devices to transmit data between them.

Device 500 can also include memory banks 510, each of which can store a listlet of pointers to data packets queued in the master linked list. Further device 500 can include cache 515 that can maintain data, such as data packets, identifiers, linked list nodes, etc., which is quickly accessible to data manager 505.

Data manager 505 can manage a master linked list of data packets in a first-in first-out (FIFO) order. Data manager 505 can utilize one or more memory banks 510 to store the data packets. The master linked list can be comprised of multiple listlets that, when combined, form the master linked list. A listlet can be a linked list stored in a single memory bank that tracks pointers to data packets. A master linked list can be made up of the listlets stored in each memory bank 510. Each memory bank can also be used to store data packets for the master linked list, although the data packets may all be stored in one memory bank 510. Thus, if two memory banks 510 are used to store listlets forming the master linked list, the master linked list would be made up of two listlets that are each assigned to a different one of the two memory banks 510.

Each node of a listlet can include a data pointer that points to a data packet, a next node pointer that points to the next node in the listlet, and a next listlet identifier that identifies the listlet that contains the next node in the master linked list. The next listlet identifier can be a bit or group of bits that identify the listlet that contains the next node in the master linked list. For example, if the master linked list is made up of two memory banks 510 and thus two listlets, the next listlet identifier can be a single bit that data manager 505 can set to either '0' or '1' to identify one of the two listlets that includes the next node in the master linked list.

Data manager 505 can store the head node and tail node of each listlet in cache 515, rather than in memory banks 510. This can allow data manager 505 to quickly access, read and modify the head node and tail node of each listlet from cache 515, which can be faster memory than data banks 510. Data manager 505 can also track the location of the head node and tail node of the master linked list in cache 515. For example, data manager 505 can store a master linked list head identifier in cache 515 that identifies the listlet that contains the head node of the master linked list. Likewise, data manager 505 can store a master linked list tail identifier that identifies the listlet that contains the tail node of the master linked list. Similar to the next listlet identifier included in each node of a listlet, the master linked list head identifier and master linked list tail identifier can be one or more bits that identify one of the listlets.

Data manager 505 can use the data in cache 515 and the listlets to push and pop data packets from the master linked list. As the data packets are pushed and popped from the master linked list, data manager 505 can update the individual listlets and the data in cache accordingly.

Figure 6:
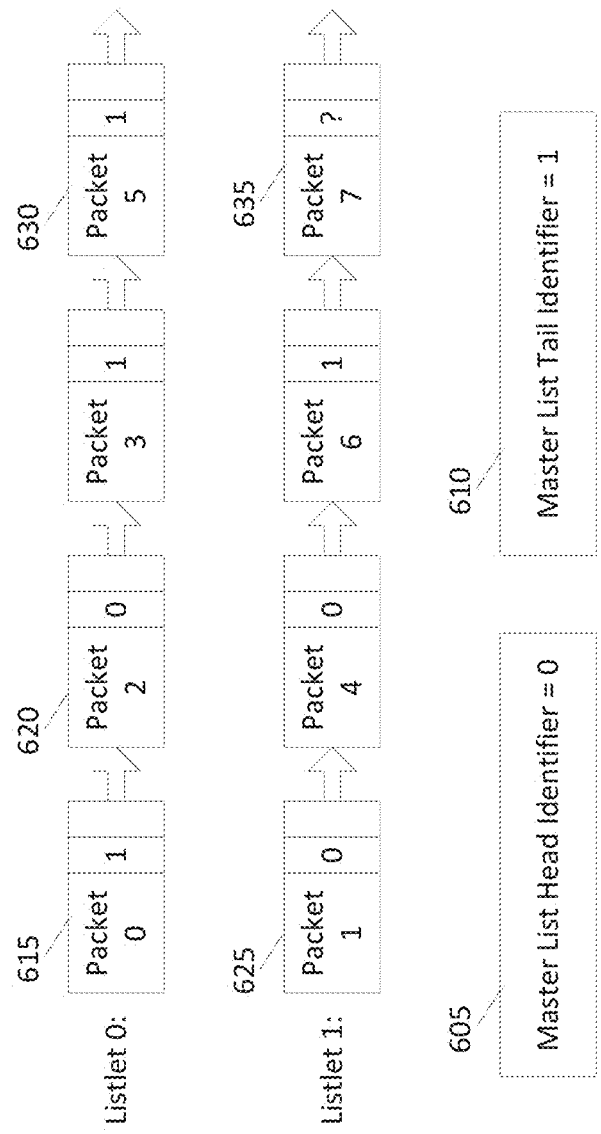
FIG. 6 illustrates an example of managing a master linked list using multiple listlets.

FIG. 6 illustrates an example of managing a master linked list using multiple listlets. FIG. 6 will be described in view of the system illustrated in FIG. 5. As shown, two listlets, listlet 0 and listlet 1, make up a master linked list of eight nodes, each node pointing to a different one of data packets 0-7. Listlet 0 and listlet 1 can each be assigned to a different memory bank 510 such that listlet 0 and listlet 1 can be read and written in parallel, therefore doubling the total linked list access throughput.

Master linked list head identifier 605 indicates that the head node of the master linked list is in listlet 0, and master linked list tail identifier 610 indicates that the tail of the master linked list is in listlet 1. Both master linked list head identifier 605 and master linked list tail identifier 610 can be stored in cache 515. The head node and tail node of listlet 0 and listlet 1 can also be stored in cache 515. Thus, as shown in FIG. 6A, node 615 and node 625, which are the head nodes of listlet 0 and listlet 1, and node 630 and node 635, which are the tail nodes of listlet 0 and listlet 1, can be stored in cache 515. The remaining nodes in listlet 0 and listlet 1, i.e. any node that is not the head node or tail node of a listlet, can be stored in the memory bank associated with its corresponding listlet.

As shown, the nodes of the listlets each include a pointer to a data packet, a pointer to the next node in the respective listlet and a next listlet identifier that identifies the listlet that contains the next node in the master linked list. For example, node 615 includes a pointer to data packet 0, a pointer to node 620, which is the next node in listlet 0, and a next listlet identifier that identifies listlet 1 as containing the next node in the master linked list. Accordingly, node 625, which is the head node in listlet 1, is the next node after node 615 in the master linked list, while node 620 is the next node in listlet 0 after node 615.

As shown, node 630 and node 635, which are the tail nodes of listlet 0 and listlet 1 respectively, do not include a pointer value for the next node in their respective listlet. However, node 630, which is not the tail node of the master linked list, does include a next listlet identifier value, while node 635, which is the tail node of the master linked list, does not include a next listlet identifier value.

To pop/dequeue a node from the master linked list, data manager 505 can access master linked list head identifier 605 from cache 515 to determine which listlet contains the head node of the master linked list. As shown, master linked list head identifier 605 identifies listlet 0 as containing the head node of the master linked list. Data manager 505 can then access node 615, which is the head node of listlet 0, from cache 515 to pop node 615 from the master linked list. This can include accessing the data packet that node 615 points to, which can then be processed for any intended purpose, such as transmitted to a receiving device. Data manager 505 can remove node 615 from listlet 0, thereby removing node 615 from the master linked list. Node 620 is the next node pointed to by node 615 in listlet 0, and as a result of node 615 being removed; node 620 will become the head node of listlet 0.

Data manager 505 can update the master linked list head identifier 605 according to the next list identifier of a popped/dequeued node. For example, upon popping node 615 from the master linked list, data manager 505 can update master linked list head identifier 605 to be the value of the next list identifier of node 615, resulting in data manager 505 changing the value of master linked list head identifier 605 from 0 to 1.

To push/enqueue a data packet to the master linked list, data manager 505 can push the data packet to any available listlet and then update master linked list tail identifier 610 accordingly. This can allow data manager 505 to push the packet pointer node to any available memory bank 510.

As shown in FIG. 6, data manager 505 can push a data packet to listlet 0 or listlet 1. If data manager 505 pushes the data packet to listlet 0, a new node can be added to the tail of listlet 0, resulting in the pointer of the next node for node 630 pointing to the newly added node. The newly added node will include a pointer to the location of the data packet. Because the newly added node will be the tail node of the master linked list, the new node will not have a value for the pointer to the next node or the next listlet identifier, as both are unknown. Because node 630 is replaced by the new node as the tail of listlet 0, node 630 is moved from cache 515 to memory bank 510, which is slower than cache 515. The new tail node of listel 0 then takes the place of node 630 in cache 515. This is the only access to the memory bank 510 containing listel 0 in this operation.

Further, data manager 505 can update node 635 to set the next listlet identifier to indicate that listlet 0 includes the next node in the master linked list after node 635. Data manager 505 can also update master linked list tail identifier 610 to indicate that the tail node of the master linked list is in listlet 0.

If data manager 505 pushes the data packet to listlet 1 rather than listlet 0, data manager 505 would add the new node to the tail of listlet 1 such that node 635 points to the new node. Further, the next listlet identifier for node 635 would be updated to indicate that the next node in the master linked list after node 635 is in listlet 1. Because node 635 is replaced by the new node as the tail of listlet 1, node 635 is moved from cache 515 to the slower memory bank 510, with the new tail taking its place in cache 515. This is the only access to the memory bank 510 containing listel 1 in this operation.

It has been established that pushing into listlet 0 results in a single access to the memory bank 510 that contains listlet 0, while pushing into listlet 1 results in a single access to the memory back 510 that contains listel 1. Therefore simultaneously pushing into listlet 0 and listlet 1 results in access to memory banks 510, that contain listel 0 and listlet 1, respectively, without conflict.

It has also been established that data manger 505 is free to choose which listlet to push the next packet into, without affecting the order of the packet in the master linked list.

In some embodiments, data manger 505 can be configured to push/enqueue multiple data packets to the master linked list in a single cycle. For example, data manager 505 can push one data packet to each memory bank 510 per processor cycle. This allows data manager 505 to push one data packet to each available listlet in a single cycle, thereby increasing the speed at which data packets can be enqueued to the master linked list. For example, data manager 505 can push a data packet onto each listlet 0 and listlet 1 in a single cycle.

This allows data manager 505 to be configured to pop/dequeue multiple data packets from the master linked list in a single cycle. For example, data manager 505 can pop one data packet from each memory bank 510 per processor cycle. This allows data manager 505 to pop one data packet from each available listlet in a single cycle, thereby increasing the speed at which data packets can be dequeued from the master linked list.

To ensure that the master linked list remains in the correct order, data manager 505 can be configured to alternate between the listlets in a round robin order when pushing data packets into the listlets. This ensures that the head of each listlet represents the first nodes of the master linked list. For example, if two listlets are used to form a master linked list, the head node of each listlet would represent the first and second node of the master linked list and the head node of each listlet can be popped in a single cycle while retaining the order of the master linked list.

Because increasing push and pop throughput is simply a matter of customizing the data manager's 505 bank picking policy using the same basic design, the method can be easily implemented to speed up push and pop simultaneously. For example in order to double push and pop throughputs, we can use 4 listlets with 4 memory banks 510. Data manager 505 is free to choose between listlet groups {0,1} and {2,3} to push the next packet. To push two packets in parallel, data manager 505 can send one to {0,1} and the other to {2,3}. Then within each group data manager 505 can pick the memory bank 510 by alternating between 0 and 1, or 2 and 3. On pop/dequeue, the next two packets will come from different listlets and thus different memory banks 510 (either from different groups, or if they are from the same group, from different banks in the group).

Figure 7:
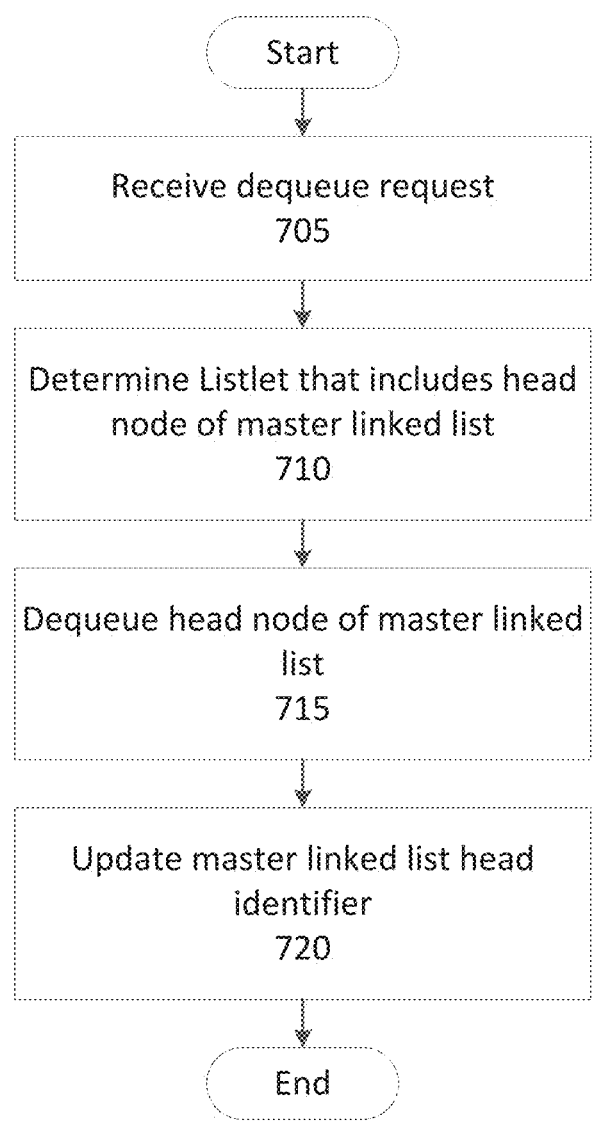
FIG. 7 illustrates an example method of dequeuing a data packet from a master linked list.

FIG. 7 illustrates an example method of dequeuing a data packet from a master linked list. The method will be described in view of the system described in FIG. 5. As shown, the method begins at block 705 where data manager 505 receives a dequeue request. A dequeue request can be any type of request, command, trigger, etc. that indicates that a data packet should be dequeued from the master linked list.

At block 710, data manager 505 determines which of the listlets that form the master linked list includes the head node of the master linked list. For example, data manager 505 can access the master linked list head identifier stored in cache 515. The master linked list head identifier can identify the listlet that includes the head of the master linked list.

At block 715, data manager 505 dequeues the head node of the master linked list. To accomplish this, data manager 505 can dequeue the head node of the listlet that includes the head of the master linked list. Dequeueing the head node can include removing the head node from the listlet, thereby removing the head node from the master linked list. This is followed by replacing the head node of the listlet that is popped with the next node in that listlet by copying it from the appropriate memory back 510.

At block 720, data manager 505 updates the master linked list head identifier to identify the listlet that includes the head node of the linked list. Data manager 505 can determine the listlet that includes the head node of the master linked list from the next listlet identifier of the node that was dequeued. The next listlet identifier of a node identifies the listlet that includes the next node in the master linked list. Data manager 505 can set the master linked list head identifier to the value of the next listlet identifier of the dequeued node.

Figure 8:
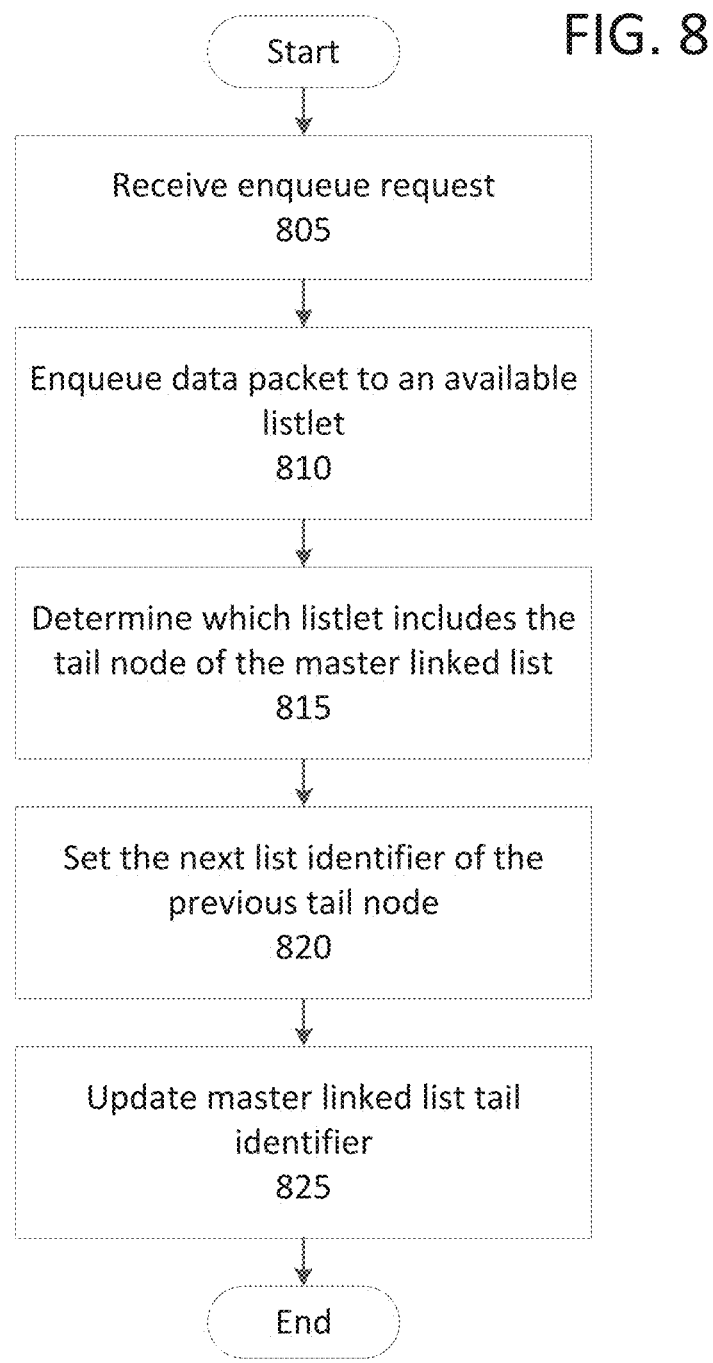
FIG. 8 illustrates an example method of enqueuing a data packet to a master linked list.

FIG. 8 illustrates an example method of enqueuing a data packet to a master linked list. The method will be described in view of the system described in FIG. 5. At block 805, data manager 505 receives an enqueue request. An enqueue request can be any type of request, command, trigger, etc. that indicates that a data packet should be enqueued to the master linked list. For example, an enqueue command can be data manager 505 receiving a data packet to be transmitted to a recipient device.

At block 810, data manager 505 can enqueue the data packet to one of the listlets that form the master linked list. In some embodiments, data manager 505 can enqueue the data packet to any of the listlets. Alternatively, in some embodiments, data manager 505 can enqueue the data packet to a listlet based on a specified enqueue order. For example, data manager 505 can enqueue data packets to the listlets in a predetermined round robin order. This can be accomplished by linking the tail node of the listlet to point to the new node, and replacing it as the listlet tail in cache 515 by moving the old tail node to memory bank 510.

At block 815, data manager 505 can determine which listlet includes the tail node of the master linked list. Data manager 505 can access master linked list tail node identifier in cache 515, which identifies the listlet that includes the tail of the master linked list.

At block 820, data manger 505 can set the next listlet identifier of the tail node in the listlet identified by the master linked list tail node identifier to the value of the listlet to which the data packet was enqueued. This results in the previous tail node of the master linked list identifying the listlet that includes the new tail of the master linked list.

At block 825, data manager 505 updates the master linked list tail node identifier to identify the listlet that includes the new tail of the master linked list. The listlet to which the data packet was enqueued is the listlet that includes the new tail of the master linked list.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
receiving, by a computer processor, a first dequeue request to pop one of a plurality of data packets from a master linked list stored via a plurality of memory banks, the master linked list formed by a plurality of listlets;
accessing, via a cache, a master linked list head identifier;
determining, by the computer processor, from the master linked list head identifier that a first listlet of the plurality of listlets includes a head of the master linked list, the head stored in the cache;
dequeueing, by the computer processor, a first head node from the first listlet, wherein the first head node includes:
a first data pointer to one of the data packets stored in a first memory bank of the plurality of memory banks,
a first next node pointer to a next node of the first listlet, and
a first next listlet identifier that identifies a second listlet of the plurality of listlets that includes a new head of the master linked list; and
updating, by the computer processor, the master linked list head identifier, the updating determined from the first next listlet identifier such that, after being updated, the master linked list head identifier identifies the second listlet instead of the first listlet,
wherein,
the cache stores heads and tails of the plurality of listlets, the master linked list head identifier, and a master linked list tail identifier.

2. The method of claim 1, further comprising:
updating the first head node to be equal to the next node of the first listlet that is pointed to by the first next node pointer.

3. The method of claim 1, further comprising:
receiving a second dequeue request to pop a second one of the plurality of data packets from the master linked list; determining, from the master linked list head identifier, that the second listlet includes the head of the master linked list;
dequeueing a second head node from the second listlet, wherein the second head node includes:
a second data pointer to another data packet stored in a second memory bank of the plurality of memory banks,
a second next node pointer to a next node of the second listlet, and
a second next listlet identifier that identifies a third listlet from the plurality of listlets that includes the new head of the master linked list; and
updating, by the computer processor, the master linked list head identifier to be equal to the second next listlet identifier such that, after being updated, the master linked list head identifier identifies the third listlet instead of the second listlet.

4. The method of claim 3, wherein dequeueing the first head node and dequeueing the second head node are performed in a single cycle.

5. The method of claim 3, wherein the first listlet and the third listlet are different listlets.

6. The method of claim 1, further comprising:
receiving a first enqueue request to push a first data packet to the master linked list;
enqueueing the first data packet to the second listlet from the plurality of listlets;
determining, from the master linked list tail identifier, that the first listlet includes the tail of the master linked list;
setting a next listlet identifier of a tail node of the first listlet to identify the second listlet; and
updating the master linked list tail identifier to identify the second listlet instead of the first listlet.

7. The method of claim 6, further comprising:
receiving a second enqueue request to push a second data packet to the master linked list;
enqueueing the second data packet to the first listlet, wherein enqueueing the first data packet and enqueueing the second data packet are performed in a single cycle;
determining, from the master linked list tail identifier, that the second listlet includes the tail of the master linked list;
setting a next listlet identifier of a tail node of the second listlet to identify the first listlet; and
updating the master linked list tail identifier to identify the first listlet instead of the first listlet.

8. A system comprising:
a computer processor;
a cache; and
a memory storing instructions that, when executed, cause the computer processor to:
receive a first dequeue request to pop one of a plurality of data packets from a master linked list stored via a plurality of memory banks, the master linked list formed by a plurality of listlets;
determine from a master linked list head identifier that a first listlet of the plurality of listslets includes a head of the master linked list, the head stored in the cache;
dequeue a first head node from the first listlet, wherein the first head node includes:
a first data pointer to one of the data packets stored in a first memory bank of the plurality of memory banks,
a first next node pointer to a next node of the first listlet, and
a first next listlet identifier that identifies a second listlet that includes a new head of the master linked list; and
update the master linked list head identifier, the update determined from the first next listlet identifier such that, after being updated, the master linked list head identifier identifies the second listlet instead of the first listlet,
wherein,
the cache stores a plurality of heads and a plurality of tails of the plurality of listlets, the master linked list head identifier, and a master linked list tail identifier.

9. The system of claim 8, wherein the instructions further cause the computer processor to:
update the first head node to be equal to the next node of the first listlet that is pointed to by the first next node pointer.

10. The system of claim 8, wherein the instructions further cause the computer processor to:
receive a second dequeue request to pop a second one of the plurality of data packets from the master linked list;
determine, from the master linked list head identifier, that the second listlet includes the head of the master linked list;
dequeue a second head node from the second listlet, wherein the second head node includes:

a second data pointer to another data packet stored in a second memory bank,
a second next node pointer to a next node of the second listlet, and
a second next listlet identifier that identifies a third listlet from the plurality of listlets that includes the new head of the master linked list; and
update, by the computer processor, the master linked list head identifier to be equal to the second next listlet identifier such that, after being updated, the master linked list head identifier identifies the third listlet instead of the second listlet.

11. The system of claim 10, wherein dequeueing the first head node and dequeueing the second head node are performed in a single cycle.

12. The system of claim 10, wherein the first listlet and the third listlet are different listlets.

13. The system of claim 8, wherein the instructions further cause the computer processor to:
receive a first enqueue request to push a first data packet to the master linked list;
enqueue the first data packet to the second listlet from the plurality of listlets;
determine, from the master linked list tail identifier, that the first listlet includes the tail of the master linked list;
set a next listlet identifier of a tail node of the first listlet to identify the second listlet; and
update the master linked list tail identifier to identify the second listlet instead of the first listlet.

14. The system of claim 13, wherein the instructions further cause the computer processor to:
receive a second enqueue request to push a second data packet to the master linked list;
enqueue the second data packet to the first listlet, wherein enqueueing the first data packet and enqueue the second data packet are performed in a single cycle;
determine, from the master linked list tail identifier, that the second listlet includes the tail of the master linked list;
set a next listlet identifier of a tail node of the second listlet to identify the first listlet; and
update the master linked list tail identifier to identify the first listlet instead of the first listlet.

15. A non-transitory computer-readable medium storing instructions that, when executed by a computer processor, cause the computer processor to:
receive a first dequeue request to pop one of a plurality of data packets from a master linked list stored via a plurality of memory banks, the master linked list formed by a plurality of linked lists;
access, via a cache, a master linked list head identifier;
determine from the master linked list head identifier that a first linked list of a plurality of listlets includes a head of the master linked list, the head stored in the cache;
dequeue a first head node from the first linked list, wherein the first head node includes:
a first data pointer to one of the data packets stored in a first memory bank of the plurality of memory banks,
a first next node pointer to a next node of the first linked list, and
a first next linked list identifier that identifies a second linked list that includes a new head of the master linked list; and
update the master linked list head identifier, the update determined from the first next linked list identifier such that, after being updated, the master linked list head identifier identifies the second linked list instead of the first linked list,
wherein,
the cache stores a plurality of heads and a plurality of tails of the plurality of linked lists, the master linked list head identifier, and a master linked list tail identifier.

16. The non-transitory computer-readable medium of claim 15, wherein the instructions further cause the computer processor to:
update the first head node to be equal to the next node of the first linked list that is pointed to by the first next node pointer.

17. The non-transitory computer-readable medium of claim 15, wherein the instructions further cause the computer processor to:
receive a second dequeue request to pop a second one of the plurality of data packets from the master linked list;
determine, from the master linked list head identifier, that the second linked list includes the head of the master linked list;
dequeue a second head node from the second linked list, wherein the second head node includes:
a second data pointer to another data packet stored in a second memory bank,
a second next node pointer to a next node of the second linked list, and
a second next linked list identifier that identifies a third linked list that includes the new head of the master linked list;
update, by the computer processor, the master linked list head identifier to be equal to the second next linked list identifier such that, after being updated, the master linked list head identifier identifies the third linked list instead of the second linked list.

18. The non-transitory computer-readable medium of claim 17, wherein dequeueing the first head node and dequeueing the second head node are performed in a single cycle.

19. The non-transitory computer-readable medium of claim 15, wherein the instructions further cause the computer processor to:
receive a first enqueue request to push a first data packet to the master linked list;
enqueue the first data packet to the second linked list;
determine, from the master linked list tail identifier, that the first linked list includes the tail of the master linked list;
set a next linked list identifier of a tail node of the first linked list to identify the second linked list; and
update the master linked list tail identifier to identify the second linked list instead of the first linked list.

20. The non-transitory computer-readable medium of claim 19, wherein the instructions further cause the computer processor to:
receive a second enqueue request to push a second data packet to the master linked list;
enqueue the second data packet to the first linked list, wherein enqueueing the first data packet and enqueue the second data packet are performed in a single cycle;
determine, from the master linked list tail identifier, that the second linked list includes the tail of the master linked list;
set a next linked list identifier of a tail node of the second linked list to identify the first linked list; and update the master linked list tail identifier to identify the first linked list instead of the first linked list.

* * * * *